US012770987B2

(12) United States Patent
Bardiau

(10) Patent No.: US 12,770,987 B2
(45) Date of Patent: Oct. 20, 2026

(54) ELECTROCHEMICAL UNIT AND CORRESPONDING MANUFACTURING METHOD AND FACILITY

(71) Applicant: SAFT, Levallois Perret (FR)

(72) Inventor: Maxence Bardiau, Le Haillan (FR)

(73) Assignee: SAFT, Levallois Perret (FR)

( * ) Notice: Subject to any disclaimer, the term of this patent is extended or adjusted under 35 U.S.C. 154(b) by 657 days.

(21) Appl. No.: 17/926,512

(22) PCT Filed: May 20, 2021

(86) PCT No.: PCT/EP2021/063476
§ 371 (c)(1),
(2) Date: Nov. 18, 2022

(87) PCT Pub. No.: WO2021/234092
PCT Pub. Date: Nov. 25, 2021

(65) Prior Publication Data

US 2023/0246307 A1 Aug. 3, 2023

(30) Foreign Application Priority Data

May 20, 2020 (FR) ..................................... 20 05269

(51) Int. Cl.
*H01M 50/502* (2021.01)
*H01M 50/533* (2021.01)
*H01M 50/536* (2021.01)

(52) U.S. Cl.
CPC ....... *H01M 50/536* (2021.01); *H01M 50/502* (2021.01); *H01M 50/533* (2021.01)

(58) Field of Classification Search
CPC .......................... H01M 50/502; H01M 50/533
See application file for complete search history.

(56) References Cited

U.S. PATENT DOCUMENTS

2007/0117009 A1* 5/2007 Yamauchi ............ H01M 50/54 429/66
2007/0134551 A1 6/2007 Cyr et al.
(Continued)

FOREIGN PATENT DOCUMENTS

CN 209401759 U * 9/2019 ........... H01M 50/54
EP 1 128 450 A2 8/2001
(Continued)

OTHER PUBLICATIONS

Rapport De Recherche Préliminaire issued in French Patent Application No. 2005269 dated Jan. 28, 2021.
(Continued)

*Primary Examiner* — Kevin E Yoon
(74) *Attorney, Agent, or Firm* — Troutman Pepper Locke LLP

(57) ABSTRACT

Such electrochemical unit comprises a first stack of electrochemical cells provided with a first electrical connection tab, a second stack of electrochemical cells provided with a second electrical connection tab, a common connection element, electrically connecting the first electrical connection tab and the second electrical connection tab and suitable for electrically connecting the first electrical connection tab and the second electrical connection tab to a connection terminal with a first polarity. The common connection element is connected by a material bond to the first electrical connection tab and to the second electrical connection tab. Application to electrochemical batteries.

11 Claims, 4 Drawing Sheets

(56) References Cited

U.S. PATENT DOCUMENTS

| | | | | |
|---|---|---|---|---|
| 2012/0189899 | A1 | 7/2012 | Kanda et al. | |
| 2015/0340726 | A1* | 11/2015 | Sasaki | H01M 10/0431 429/94 |
| 2017/0062792 | A1 | 3/2017 | Baik et al. | |
| 2018/0108949 | A1* | 4/2018 | Negishi | H01M 50/533 |

FOREIGN PATENT DOCUMENTS

| | | | |
|---|---|---|---|
| EP | 2 239 802 | A1 | 10/2010 |
| EP | 2 296 205 | A1 | 3/2011 |
| EP | 3 373 374 | A1 | 9/2018 |
| EP | 3 382 806 | A1 | 10/2018 |
| EP | 3 396 738 | A1 | 10/2018 |
| JP | 2005005215 | A * | 1/2005 |
| WO | 03/094258 | A2 | 11/2003 |
| WO | 2010/142679 | A1 | 12/2010 |
| WO | 2012/027835 | A1 | 3/2012 |
| WO | 2013/191480 | A1 | 12/2013 |
| WO | 2016/101880 | A1 | 6/2016 |

OTHER PUBLICATIONS

International Seach Report issued in International Patent Application No. PCT/EP2021/063476 dated Jul. 2, 2021, with English translation.

* cited by examiner

ELECTROCHEMICAL UNIT AND CORRESPONDING MANUFACTURING METHOD AND FACILITY

CROSS REFERENCE TO RELATED APPLICATIONS

The present application is a U.S. National Phase Application under 35 U.S.C. § 371 of International Patent Application No. PCT/EP2021/063476 filed May 20, 2021, which claims priority of French Patent Application No. 20 05269 filed May 20, 2020. The entire contents of which are hereby incorporated by reference.

FIELD OF THE INVENTION

The present invention relates to an electrochemical unit, of the type comprising

- a first stack of electrochemical elements provided with a first electrical connection tab,
- a second stack of electrochemical elements provided with a second electrical connection tab,
- a common connection element, electrically connecting the first electrical connection tab and the second electrical connection tab and suitable for electrically connecting the first electrical connection tab and the second electrical connection tab to an electrical connection terminal with a first polarity,

BACKGROUND

Electrochemical units are known e.g. from EP2239802. The electrochemical unit comprises an electrode stack and a plate head suitable for connecting the electrode stack to a current output terminal. The plate head is folded so as to be connected to the current output terminal.

Other electrochemical units or electrochemical batteries are known from EP3396738A1; EP3373374A1; WO2016101880A1; EP3382806A1; WO2012027835A1; WO2010142679A1; WO03094258A2; and EP1128450A2.

SUMMARY

The goal of the invention is to propose an easy and economical to manufacture electrochemical unit and an efficient and economical associated manufacturing method. The goal of the invention is in particular, to propose a reliable, economical and compact connection between the electrodes and the terminals of the electrochemical unit. Moreover, the electrochemical unit of the invention should have a small volume for a given energy storage capacity.

To this end, the subject matter of the invention relates to an electrochemical unit as defined above, characterized in that the first common connection element is connected by a material bond to the first electrical connection tab and to the second electrical connection tab.

According to particular embodiments of the electrochemical unit, same can have one or a plurality of the following features:

- the material bond is a connection by welding or brazing and in particular a connection by laser or ultrasonic welding;
- the common connection element is a folded metal sheet, a tab portion of which is fastened to the first and second electrical connection tabs and a terminal portion suitable for being fastened to the connection terminal;

- a) either the first electrical connection tab and the second electrical connection tab are non-coplanar, and in particular form, in a profile view, a “V” or a “U”,
- b) or the first electrical connection tab and the second electrical connection tab are essentially coplanar, and in particular, the first electrical connection tab and the second electrical connection tab extend in opposite directions and away from each other; and
- the unit comprises the connection terminal with a first polarity, and the common connection element is fastened to the connection terminal.

The further subject matter of the invention is a manufacturing method for an electrochemical unit, comprising the following, in particular successive, steps:

- a) supplying the first stack of electrochemical elements provided with the first electrical connection tab;
- b) supplying the second stack of electrochemical elements provided with the first electrical connection tab;
- c) supplying the common connection element;
- d) setting in a non-coplanar configuration, the first electrical connection tab and the second electrical connection tab such that same are non-coplanar, and in particular form, in a profile view, a “V” or a “U”;
- e) setting in a non-coplanar configuration, the common connection element and applying on the first electrical connection tab and on the second electrical connection tab;
- f) holding an anvil in place between the first and second electrical connection tabs while the first and second electrical connection tabs are in the non-coplanar configuration thereof; and
- g) producing the material bond between the common connection element and the first electrical connection tab and producing the material bond between the common connection element and the second electrical connection tab while the anvil is held in place.

According to particular embodiments of the manufacturing method, the manufacturing method can have one or a plurality of the following features:

- during step g), producing the material bond between the common connection element and the first electrical connection tab and producing the material bond between the common connection element and the second electrical connection tab take place simultaneously;
- the production of the material bond between the common connection element and the first electrical connection tab is a welding step, in particular ultrasonic or laser welding, and/or the production of the material bond between the common connection element and the second electrical connection tab is a welding step, in particular ultrasonic or laser welding;
- the production of the material bond between the common connection element and the first electrical connection tab is an ultrasonic welding step and is carried out by setting in place a first sonotrode on the side of the first electrical connection tab and the element common connection opposite the anvil, and/or in which the production of the material bond between the common connection element and the second electrical connection tab is an ultrasonic welding step and is carried out by setting in place a second sonotrode on the side of the second electrical connection tab and the element of common connection opposite the anvil; and
- one or a plurality of the additional steps, after step f):
- h) unfolding the common connection element connected to the first electrical connection tab and the common connection element connected to the second electrical connection tab, such that the first electrical connection tab and the second electrical connection tab are essentially coplanar, i) attaching the terminal portion to the connection terminal j) bending, if appropriate, the common connection element so that the terminal portion is positioned opposite the connection portion.

The further subject matter of the invention is a manufacturing installation for an electrochemical unit, comprising:

an anvil, a first and a second bonding tool, in particular, two sonotrodes or laser welding heads, and the installation being configured and suitable for implementing a method as defined above.

BRIEF DESCRIPTION OF DRAWINGS

The invention will be better understood upon reading the following description, given only as an example and making reference to the enclosed drawings, wherein.

DETAILED DESCRIPTION

The following description contains technical features of the invention. Such technical features, although presented in a technical context and, if appropriate, in combination with other technical features, can be used every time individually, without the other technical features, insofar as technically possible.

Figure 1:
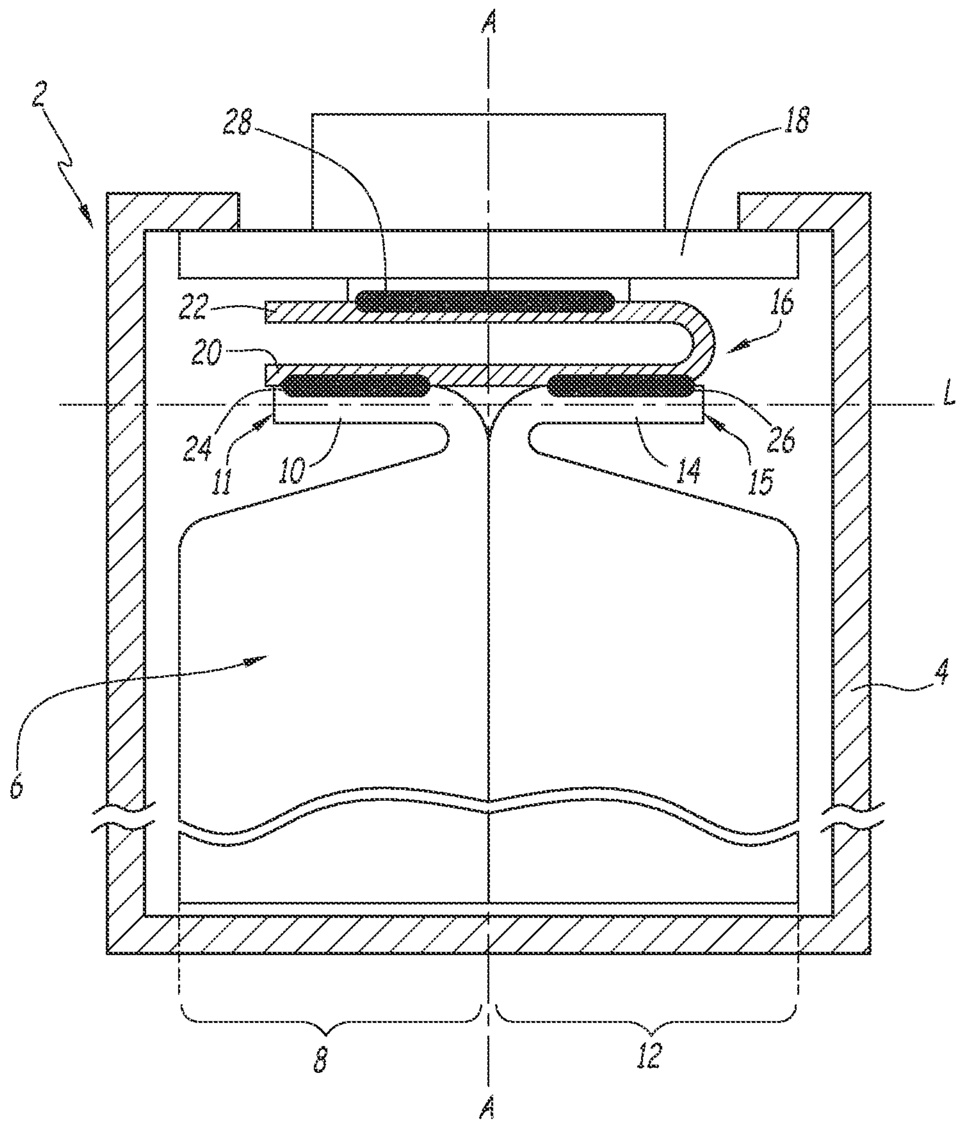
FIG. 1 is a schematic view of an electrochemical battery comprising an electrochemical unit according to the invention.

FIG. 1 shows a battery according to the invention, as indicated by the general reference 2. In said figure, the battery 2 is shown in the assembled state. The battery 2 is an electrochemical battery such as currently used in electric vehicles. However, other areas of application of the battery 2 are conceivable, such as energy storage, electric mobility, aviation, railways.

The battery 2 comprises a casing 4 and an electrochemical unit 6.

The electrochemical unit 6 comprises a first stack of electrochemical elements 8 which is provided with a first electrical connection tab 10. The electrochemical unit 6 comprises a second stack of electrochemical elements 12 which is provided with a second electrical connection tab 14. Each stack of electrochemical elements is commonly referred to as a "Stack".

The battery 2 can comprise any number of electrochemical elements 6.

The first electrical connection tab 10 consists of an overlay of metal strips which are connected or are formed in one piece with current collectors of the first stack of electrochemical elements 8. The second electrical connection tab 14 consists of an overlay of metal strips which are connected or formed in one piece with current collectors of the second stack of electrochemical elements 12.

The first stack of electrochemical elements 8 and the second stack of electrochemical elements 12 extend on both sides of a symmetry plane A-A.

The first stack of electrochemical elements 8 and the second stack of electrochemical elements 12 are arranged in the casing 4 and are electrically connected to each other, i.e. by an electrical connection in parallel.

The electrochemical unit 6 comprises a first common connection element 16 (also called a "tab"), electrically connecting the first electrical connection tab 10 and the second electrical connection tab 14.

The electrochemical unit 6 comprises a connection terminal 18 with a first polarity. The common connection element 16 is fastened to the connection terminal 18 and electrically connects the first electrical connection tab 10 and the second electrical connection tab 14 to the connection terminal 18.

The electrochemical unit 6 comprises a connection terminal with a second polarity. The two connection terminals are e.g. rigidly attached to a cover and can thus be handled as a single unit with the cover.

The casing 4 is e.g. a rectangular parallelepiped casing made of metal or of a thermoplastic material. As a variant, the casing 4 has a cylindrical shape with a circular cross-section. The casing 4 has walls which are less deformable than the walls of the stacks of electrochemical elements 8 and 12.

The common connection element 16 is a folded metal sheet provided with a tab portion 20, which is fastened to the first and second electrical connection tabs 10, 14, and provided with a terminal portion 22, which is suitable for being fastened or is fastened to the connection terminal 18.

The common connection element 16 is connected by a material bond to the first electrical connection tab 10 and to the second electrical connection tab 14. The common connection element 16, and more particularly the tab portion 20, thus forms a first connection location 24 with the first electrical connection tab 10, and a second connection location 26 with the second electrical connection tab 14. The material bond is electrically conducting. The material bond can be a connection by welding or brazing and in particular, a connection by laser or ultrasonic welding.

The common connection element 16 is electrically connected to the connection terminal 18 by a material bond. Said material bond is electrically conducting. The common connection element 16, and more particularly the terminal portion 22, thus forms a third connection location 28 with the connection terminal 18.

As can be seen in FIG. 1, in the assembled state of the battery 2, or when the electrochemical unit 6 is finished, but before the battery 2 is assembled, the first electrical connection tab 10 and the second electrical connection tab 14 are essentially coplanar and extend along a tab plane L-L. This is the state after assembly. In such configuration, the first electrical connection tab 10 and the second electrical connection tab 14 extend in opposite directions and away from each other. More precisely, the first electrical connection tab 10 and the second electrical connection tab 14 each comprise one end or a free edge 11, 15 respectively, which extend in opposite directions and away from each other.

Figure 2:
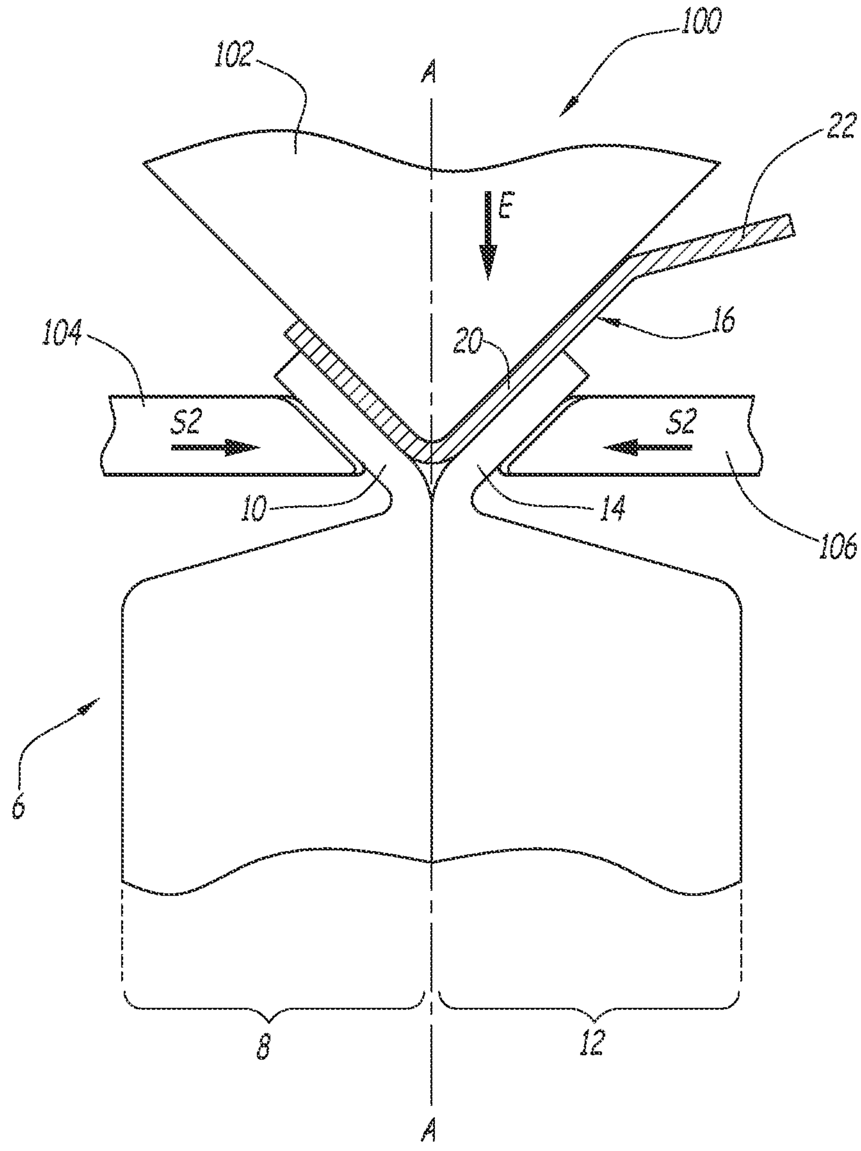
FIG. 2 is a schematic partially sectional view of an electrochemical unit according to the invention during a first step of the manufacture thereof, using a manufacturing installation according to the invention.

As can be seen in FIG. 2, during assembly, the first electrical connection tab 10 and the second electrical connection tab 14 are non-coplanar. In particular, the two electrical connection tabs 10, 14 form, in a profile view, a "V". Moreover, the two electrical connection tabs 10, 14 are preferentially symmetrical with respect to the plane of symmetry A-A.

Alternatively, the two electrical connection tabs form, in a profile view, a "U".

Figure 3:
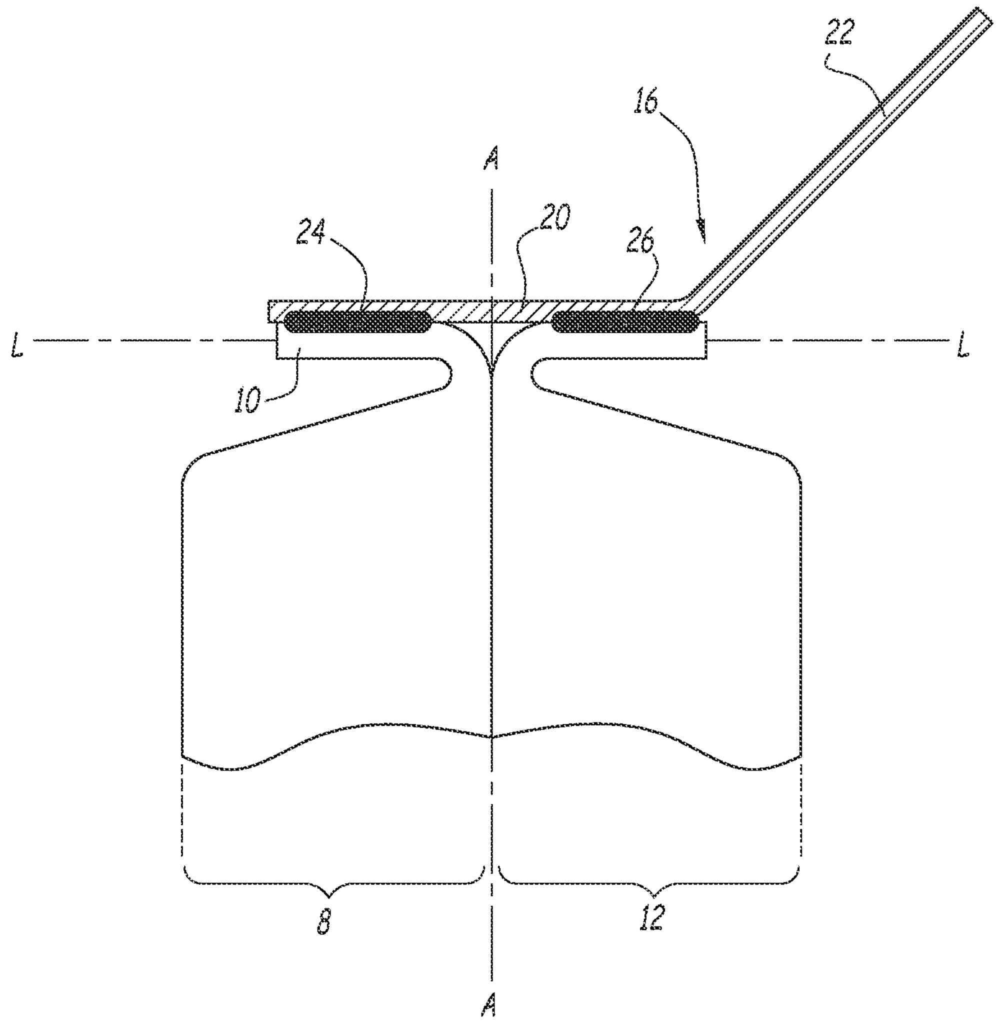
FIG. 3 shows, according to a view similar to the view shown in FIG. 2, the electrochemical unit according to the invention during a second step of the manufacture thereof.

The steps of a method of manufacturing an electrochemical unit 6, of the battery 2, respectively, as disclosed above, will be explained hereinafter with reference to FIGS. 2 to 4.

FIG. 2 shows a manufacturing installation 100 for an electrochemical unit 6 according to the invention. The manufacturing installation 100 comprises an anvil 102, a first bonding tool 104 and a second bonding tool 106.

The manufacturing method comprises the following, in particular successive steps.

Firstly, the first stack of electrochemical elements 8 provided with the first electrical connection tab 10 is supplied and the second stack of electrochemical elements 12 provided with the second electrical connection tab 14 is supplied.

Then, or in parallel, the common connection element 16 is supplied.

The first electrical connection tab 10 and the second electrical connection tab 14 are set in a non-coplanar configuration, namely in such a way that same are non-coplanar, and in particular form, in a profile view, a "V" or a "U". The "V" configuration is shown in FIG. 2.

The common connection element 16 is then set in a non-coplanar configuration. In such configuration, the tab portion 20 has a shape matching the shape of the first two electrical connection tabs 10 and the second electrical connection tab 14. The tab portion 20 thus has a "V" or "U" shape.

The tab portion 20 is then applied to the first electrical connection tab 10 and to the second electrical connection tab 14.

Next, the anvil 102 is set in place, along an anvil positioning direction E which extends in the plane A-A, over the tab portion 20 and arranged between the first and second electrical connection tabs 10, 14.

The anvil 102 is held between the first and second electrical connection tabs 10, 14 while both the first and second electrical connection tabs are in the non-coplanar configuration thereof.

Next, the first bonding tool 104 and the second bonding tool 106 are applied to the first electrical connection tab and to the second electrical connection tab 14 along an application direction S1 and S2, respectively, directed toward each other and perpendicular to the plane of symmetry A-A (see FIG. 2).

Finally, the material bond between the common connection element, more precisely the tab portion 20, and the first electrical connection tab 10 is produced, as well as the material bond between the common connection element 16, more precisely the tab portion 20, and the second electrical connection tab 14, while the anvil 102 is held in place during the production of the two material bonds.

Preferentially, the production of the material bond between the common connection element 16 and the first electrical connection tab 10 and the production of the material bond between the common connection element and the second electrical connection tab take place simultaneously.

Advantageously, the production of the material bond between the common connection element 16 and the first electrical connection tab 10 is a welding step, in particular, an ultrasonic or laser welding step. In such case, the first bonding tool 104 is a sonotrode or a laser welding head.

Advantageously, the production of the material bond between the common connection element 16 and the second electrical connection tab 14 is a welding step, in particular, an ultrasonic or laser welding step. In such case, the second bonding tool 106 is a sonotrode or a laser welding head.

More precisely, the production of the material bond at the location 24 between the common connection element 16 and the first electrical connection tab can be an ultrasonic welding step. In such case, the bond is produced by fitting a first sonotrode on the side of the first electrical connection tab 10 and the common connection element 16 opposite the anvil. The production of the material bond at the location 26 between the common connection element 16 and the second electrical connection tab 14, is an ultrasonic welding step and is carried out by setting in place a second sonotrode on the side of the second connection tab electrical and the common connection element opposite the anvil.

Once the material bonds between the common connection element 16 and the two connection tabs 10 and 14 have been established, the following steps are implemented.

Of course, the anvil 102 and the first and second bonding tools 104, 106 are removed.

The common connection element 16 which is connected to the first electrical connection tab 10 and to the second electrical connection tab 14 and the electrical connection tabs 10, 14 are unfolded, such that the first electrical connection tab 10 and the second electrical connection tab 14 are essentially coplanar. The first stack of electrochemical elements 8, the second stack of electrochemical elements 12 and the common connection element 16 are then set in the configuration shown in FIG. 3.

In such configuration, the first electrical connection tab 10 and the second electrical connection tab 14 extend in opposite directions and away from each other. More precisely, the first electrical connection tab 10 and the second electrical connection tab 14 each comprise one end or a free edge 11, 15 respectively, which extend in opposite directions and away from each other.

Figure 4:
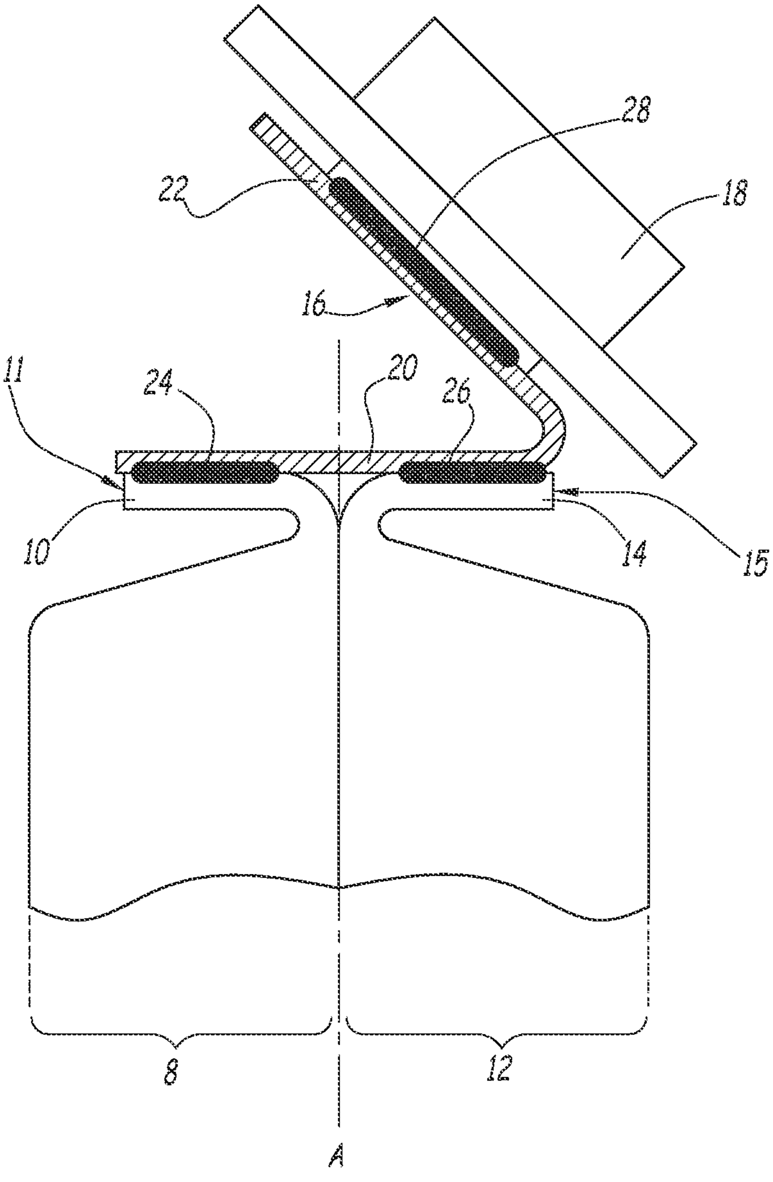
FIG. 4 shows, according to a view similar to the view shown in FIG. 3, the electrochemical unit according to the invention during a third step of the manufacture thereof.

The connection terminal 18 is then fastened to the terminal portion 22, e.g. by brazing or laser welding or by ultrasonic welding, in a configuration shown in FIG. 4.

The above method can then further be implemented for the electrical connection elements with the second polarity. In such case, the step of fastening the connection terminal 18 of the second polarity to the terminal portion 22 with the second polarity is performed while the connection terminal 18 of the first polarity is already in the fastened state onto the terminal portion 22 with the first polarity or simultaneously with said fastening of the connection terminal 18 of the first polarity. The two connection terminals 18 are then obtained, which are in the fastened state, onto the terminal portion 22 of the corresponding polarity.

The connection terminals 18 of the two polarities can be rigidly attached to the same cover of the battery 2.

The common connection element 16 is then folded in such a way that the terminal portion 22 is positioned opposite the connection portion 20.

In the case where the connection terminals 18 of the two polarities are rigidly attached to the same cover and in the fastened state onto the terminal portion 22 with the corresponding polarity, the common connection elements 16 of the two polarities are folded simultaneously.

Finally, the casing 4 is set in place around the elements previously produced, hence obtaining the battery 2.

The battery, method and installation according to the invention lead to short manufacturing cycle times and to an economical manufacture.

The invention claimed is:

1. An electrochemical unit of the type comprising a first stack of electrochemical elements provided with a first electrical connection tab, a second stack of electrochemical elements provided with a second electrical connection tab, wherein the first electrical connection tab and the second electrical connection tab are non-coplanar and form, in a profile view, a “V”, a common connection element, electrically connecting the first electrical connection tab and the second electrical connection tab and electrically connecting the first electrical connection tab and the second electrical connection tab to an electrical connection terminal with a first polarity, wherein the common connection element is connected by a material bond to the first electrical connection tab and to the second electrical connection tab, wherein the common connection element is electrically connected to the electrical connection terminal by a material bond, wherein the common connection element is set in a non-coplanar configuration matching the non-coplanar “V” shaped profile of the first electrical connection element and the second electrical connection element.

2. The electrochemical unit according to claim 1, wherein the material bond is a welding or brazing bonding.

3. The electrochemical unit according to claim 2, wherein the material bond is a laser or ultrasonic welding bonding.

4. The electrochemical unit according to claim 1, wherein the common connection element is a folded metal sheet, a tab portion of which is fastened to the first and second electrical connection tabs and a terminal portion of which is suitable for being fastened to the connection terminal.

5. The electrochemical unit according to claim 1, comprising the connection terminal with a first polarity, and wherein the common connection element is fastened to the connection terminal.

6. A manufacturing process for an electrochemical unit according to claim 1, comprising the following steps or successive steps:

a) supplying the first stack of electrochemical elements provided with the first electrical connection tab;

b) supplying the second stack of electrochemical elements provided with the second electrical connection tab;

c) supplying the common connection element;

d) setting in a non-coplanar configuration, the first electrical connection tab and the second electrical connection tab such that they are non-coplanar and form, in a profile view, a “V”;

e) setting in a non-coplanar configuration, the common connection element and application onto the first electrical connection tab and onto the second electrical connection tab;

f) holding an anvil in place between the first and second electrical connection tabs while the first and second electrical connection tabs are in their non-coplanar configuration; and g) producing the material connection between the common connection element and the first electrical connection tab and producing the material connection between the common connection element and the second electrical connection tab while the anvil is held in place.

7. The manufacturing method according to claim 6, wherein during the step g), the production of the material bond between the common connection element and the first electrical connection tab and the production of the material bond between the common connection element and the second electrical connection tab take place simultaneously.

8. The manufacturing method according to claim 7, wherein the method comprises one or more of the following:

the production of the material bond between the common connection element and the first electrical connection tab is a welding step, the production of the material bond between the common connection element and the second electrical connection tab is a welding step.

9. The manufacturing method according to claim 8, wherein the method comprises one or more of the following:

the production of the material bond between the common connection element and the first electrical connection tab is an ultrasonic welding step and is carried out by setting in place a first sonotrode on the side of the first electrical connection tab and the common connection element opposite the anvil, the production of the material bond between the common connection element and the second electrical connection tab is an ultrasonic welding step and is carried out by setting in place a second sonotrode on the side of the second electrical connection tab and the common connection element opposite the anvil.

10. The manufacturing method according to claim 8, wherein the method comprises one or more of the following:

the production of the material bond between the common connection element and the first electrical connection tab is an ultrasonic or laser welding step, the production of the material bond between the common connection element and the second electrical connection tab is an ultrasonic or laser welding step.

11. The manufacturing method according to claim 6, comprising, after step f), one or more of the following additional steps:

h) unfolding the common connection element connected to the first electrical connection tab and the common connection element connected to the second electrical connection tab, such that the first electrical connection tab and the second electrical connection tab are essentially coplanar, i) fastening the terminal portion to the connection terminal, j) bending, if appropriate, the common connection element so that the terminal portion is positioned opposite the connection portion.

* * * * *